US011429167B2

(12) United States Patent
Jakes et al.

(10) Patent No.: US 11,429,167 B2
(45) Date of Patent: Aug. 30, 2022

(54) TECHNIQUES TO DECOMMISSION BATTERY BASED ON USER COMMAND

(71) Applicant: Lenovo (Singapore) Pte. Ltd., Singapore (SG)

(72) Inventors: Philip John Jakes, Durham, NC (US); Jeremy Robert Carlson, Cary, NC (US); Larry Glenn Estes, Durham, NC (US); Bouziane Yebka, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 139 days.

(21) Appl. No.: 16/931,718

(22) Filed: Jul. 17, 2020

(65) Prior Publication Data
US 2022/0019273 A1 Jan. 20, 2022

(51) Int. Cl.
*G06F 1/26* (2006.01)
*H01M 10/42* (2006.01)
*H01R 11/28* (2006.01)
*H01M 10/54* (2006.01)

(52) U.S. Cl.
CPC ............ *G06F 1/26* (2013.01); *H01M 10/425* (2013.01); *H01R 11/282* (2013.01)

(58) Field of Classification Search
CPC ....... G06F 1/26; H01M 10/425; H01M 10/54; H01M 10/448; H01M 50/204; H01M 2010/4271; H01M 2010/4278; H01R 11/282
USPC ......................................... 713/300, 320, 330
See application file for complete search history.

(56) References Cited

U.S. PATENT DOCUMENTS

| 5,479,084 | A | 12/1995 | Satsuma et al. |
| 5,751,217 | A | 5/1998 | Kchao et al. |
| 5,920,180 | A | 7/1999 | Kim |
| 6,288,521 | B1 | 9/2001 | Meador |
| 6,531,847 | B1 | 3/2003 | Tsukamoto et al. |
| 8,578,184 | B2 * | 11/2013 | Nishimura ................ H02J 3/32 700/286 |
| 8,659,267 | B2 | 2/2014 | Yun |
| 2001/0028238 | A1 | 10/2001 | Nakamura et al. |
| 2001/0035740 | A1 | 11/2001 | Palanisamy |
| 2004/0128089 | A1 | 7/2004 | Barsoukov et al. |
| 2004/0189250 | A1 * | 9/2004 | Nishida ................ H02J 7/0024 320/116 |
| 2005/0001710 | A1 | 1/2005 | Mukai et al. |
| 2005/0170256 | A1 | 8/2005 | Cummings |
| 2008/0116851 | A1 | 5/2008 | Mori |
| 2009/0031122 | A1 * | 1/2009 | Hodzic ..................... G06F 1/24 713/1 |

(Continued)

OTHER PUBLICATIONS

Yebka et al., "Devices and Methods to Discharge Battery", file history of related U.S. Appl. No. 14/874,950, filed Oct. 5, 2015.

(Continued)

*Primary Examiner* — Michael J Brown
(74) *Attorney, Agent, or Firm* — John M. Rogitz; John L. Rogitz

(57) ABSTRACT

In one aspect a device includes at least one processor, a battery that powers the at least one processor, and storage accessible to the at least one processor. The device also includes circuitry to, responsive to a user command to decommission the battery, discharge the battery to render the battery inoperable.

20 Claims, 7 Drawing Sheets

(56) References Cited

U.S. PATENT DOCUMENTS

| | | | |
|---|---|---|---|
| 2010/0085015 A1 | 4/2010 | Hamaguchi et al. | |
| 2011/0019326 A1 | 1/2011 | Odaohhara | |
| 2011/0089907 A1 | 4/2011 | Bhardwaj et al. | |
| 2011/0270559 A1 | 11/2011 | Christophersen et al. | |
| 2012/0139494 A1 | 6/2012 | Kim | |
| 2012/0153902 A1 | 6/2012 | Yebka et al. | |
| 2012/0274335 A1 | 11/2012 | Matsuura | |
| 2012/0313568 A1 | 12/2012 | Paluszek et al. | |
| 2013/0067253 A1* | 3/2013 | Tsuda | G06Q 50/06 713/300 |
| 2013/0181681 A1 | 7/2013 | Mukai et al. | |
| 2013/0187616 A1* | 7/2013 | Chuang | H01M 10/44 320/135 |
| 2013/0249494 A1 | 9/2013 | Ju et al. | |
| 2013/0307476 A1 | 11/2013 | Darragh et al. | |
| 2014/0019789 A1 | 1/2014 | Bhardwaj et al. | |
| 2014/0342193 A1 | 11/2014 | Mull et al. | |
| 2015/0061572 A1 | 3/2015 | Ju et al. | |
| 2015/0200537 A1 | 7/2015 | Kang et al. | |
| 2015/0258341 A1 | 9/2015 | Ternes et al. | |
| 2015/0340899 A1 | 11/2015 | Bilezikjian et al. | |
| 2015/0357845 A1 | 12/2015 | Railey | |
| 2016/0064968 A1 | 3/2016 | Lee et al. | |
| 2016/0097820 A1 | 4/2016 | Thompson et al. | |
| 2016/0141893 A1* | 5/2016 | Lee | G06F 1/263 320/134 |
| 2016/0149275 A1 | 5/2016 | Minamiura | |
| 2016/0149423 A1 | 5/2016 | Liu et al. | |
| 2016/0201634 A1 | 7/2016 | Kim et al. | |
| 2017/0077717 A1 | 3/2017 | Lundgren et al. | |
| 2017/0329593 A1* | 11/2017 | McMullen | G06F 11/1433 |
| 2018/0131206 A1* | 5/2018 | Coq | H02J 7/0047 |
| 2020/0412136 A1* | 12/2020 | Kristjansson | H02J 7/0014 |

OTHER PUBLICATIONS

Yebka et al., "Shorting Battery to Ground Responsive to Battery Impedance Reaching Threshold", file history of related U.S. Appl. No. 14/963,532, filed Dec. 9, 2015.

* cited by examiner

TECHNIQUES TO DECOMMISSION BATTERY BASED ON USER COMMAND

FIELD

The present application relates to technically inventive, non-routine solutions that are necessarily rooted in computer technology and that produce concrete technical improvements.

BACKGROUND

As recognized herein, batteries are often improperly discarded when the devices in which they are disposed are themselves discarded. Improper battery disposal can lead to dangerous issues such as short-circuit-induced fires at waste disposal facilities and materials recycling facilities, posing a significant safety hazard to those nearby, emitting toxic chemicals into the air, and adding to carbon emissions.

Some batteries cannot even be removed from the device in which they are disposed by the average end-user since the manufacturer typically intends for them to not be removed, meaning the average end-user cannot properly separate and place the battery itself into the recycling chain. Instead, the end-user often just throws the entire device away into general refuse rather than attempting to recycle the battery or separately provide it to someone who can themselves prevent battery malfunctions or damage during disposal.

Furthermore, it is not practical for the disposal or recycling facilities to themselves disassemble each device to dispose of the batteries inside as that process is slow and costly and often times involves specialized tools and training. What's more, even where facilities do so, the tools used to disassemble the devices to access the batteries often inadvertently puncture the battery itself, also causing a chemical safety hazard and potential for fire.

Accordingly, there are currently no adequate solutions to the foregoing computer-related, technological problem.

SUMMARY

Accordingly, in one aspect a first device includes at least one processor, a battery that powers the at least one processor, and storage accessible to the at least one processor. The first device also includes circuitry to, responsive to a user command to decommission the battery, discharge the battery to render the battery inoperable.

In some example implementations, the circuitry may, responsive to the user command to decommission the battery, self-discharge the battery to render the battery inoperable. So, for example, the first device may include a display accessible to the at least one processor, and the storage may include instructions executable by the at least one processor to initiate decommissioning software for the device. The instructions may then be executable to present a graphical user interface (GUI) on the display responsive to initiation of the decommissioning software, where the GUI may include a selector that is selectable to generate the user command to decommission the battery.

Additionally or alternatively, the circuitry may include a button that is selectable to generate the user command. Thus, in some implementations the first device may include a housing for the device so that button may be accessible through a pin hole in the housing. In certain examples, the circuitry may self-discharge the battery responsive to the button being continuously selected for a threshold non-zero amount of time. Also in certain examples, selection of the button may complete a circuit to self-discharge the battery.

Still further, in some example implementations the circuitry may include a port at which a second, different device is connectable. The port may provide a connection for the second device to discharge the battery responsive to the user command. In these implementations, the user command may be received at the second device, and/or may be received at the first device but may not be provided through the second device. In certain examples, the port may be a port at which a power adapter or charger is connectable, where the power adapter or charger may be different from the first and second devices themselves. Alternatively, the port may be a first port different from a second port at which a power adapter or charger is connectable, and the first port may be dedicated to discharging the battery to render the battery inoperable.

Also in certain example implementations, the circuitry may include firmware and a discharge circuit, where the firmware may control the discharge circuit to concurrently discharge all cells in the battery responsive to receiving the user command and without the use of a load external to the battery.

Still further, in some example implementations the circuitry may include a dedicated discharge circuit for decommissioning the battery responsive to the user command. The dedicated discharge circuit may not be used by the battery for other purposes prior to the first device receiving the user command.

In another aspect, a method includes receiving, at a device including a battery, a user command to decommission the battery. The method also includes, responsive to receiving the user command, decommissioning the battery via battery self-discharge. Decommissioning the battery includes rendering the battery permanently inoperable.

Accordingly, in some examples the method may include using, responsive to receiving the user command, at least one resistor and battery firmware to control self-discharge of the battery to concurrently discharge each cell in the battery.

Also in some examples, the method may include presenting a graphical user interface (GUI) on an electronic display, where the GUI may include a selector that is selectable to generate the user command. Additionally or alternatively, the user command may be received via actuation of at least one hardware element on the device.

In still another aspect, a battery pack includes one or more battery cells, a processor, and firmware. The firmware, under control of the processor and responsive to receipt of a user command to decommission the battery pack, uses a circuit within the battery pack to concurrently discharge each of the one or more battery cells.

In various example implementations, the user command may be received via selection of a selector presented on an electronic display and/or via selection of a hardware button accessible via a hole in a housing of a device in which the battery pack is disposed.

The details of present principles, both as to their structure and operation, can best be understood in reference to the accompanying drawings, in which like reference numerals refer to like parts, and in which:

DETAILED DESCRIPTION

Figure 1:
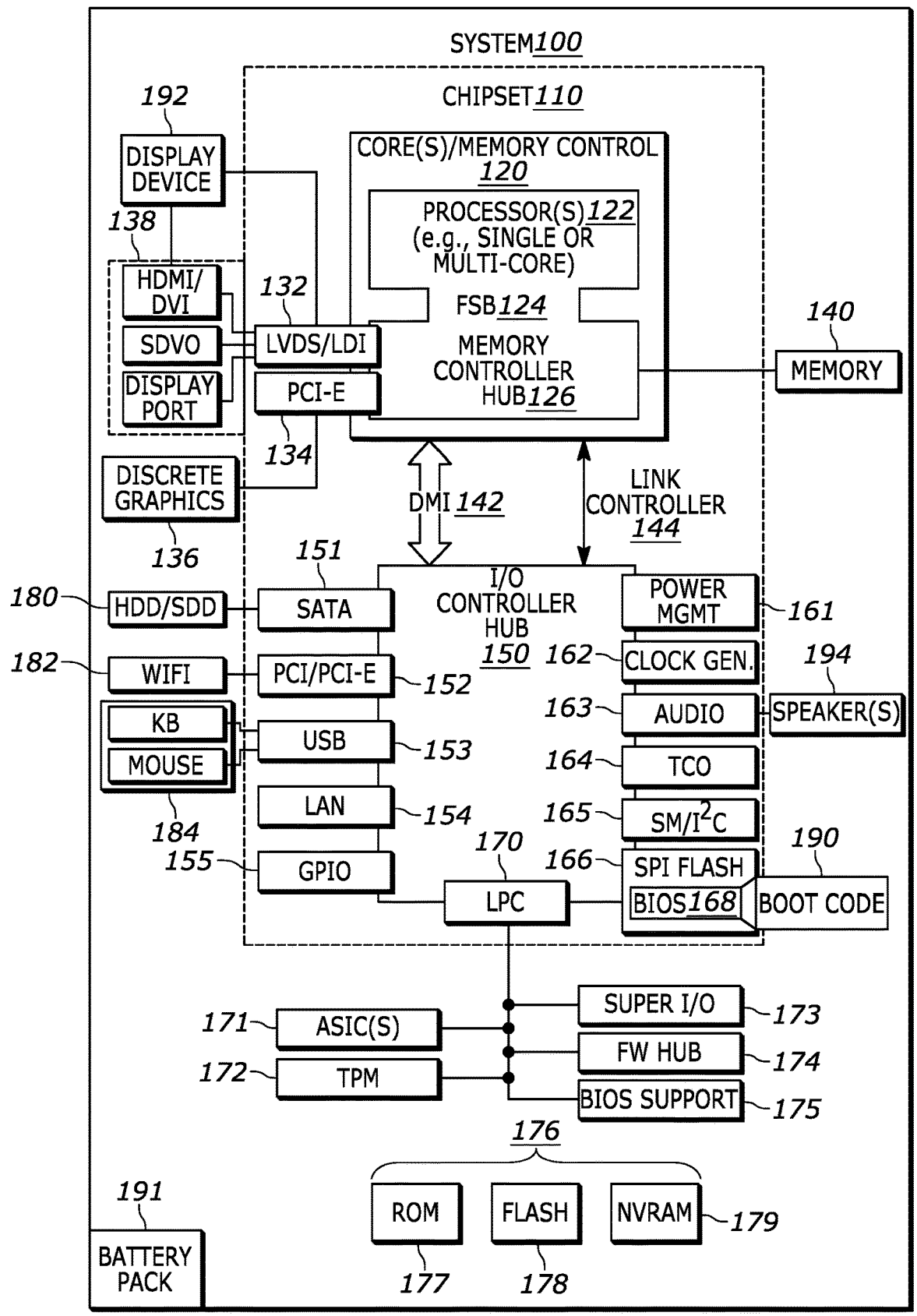
FIG. 1 is a block diagram of an example system consistent with present principles.

The present disclosure is directed to, among other things, providing for batteries to be fully discharged before arriving at a recycling facility or other waste disposal facility, allowing the batteries to be safely disassembled or potentially just recycled as part of the general waste stream. A self-discharge mode for the battery can be used, which could be activated by software (e.g., as part of a decommissioning process/program used to prepare the device for disposal) and/or via a physical connector exposed to the outside of the battery (such as a button). Once the battery is rendered inoperable via the discharging, it may no longer be able to provide power to the device in which it is disposed and may no longer be able to receive a charge to recharge itself.

Resistors otherwise used to balance cell capacity within the pack may be used to fully discharge the cells simultaneously as part of decommissioning, though another dedicated circuit for full discharging of the cells may also be used to speed self-discharge of the battery or to perform self-discharge by itself without the aid of the cell balancing resistors. Battery pack firmware can also be executed to utilize these current paths to fully discharge all cells simultaneously, without an external load being connected or the device itself even being powered on and/or used. Furthermore, in using the resistor(s) the cell discharge may be slow enough to not generate an unsafe or undesirable amount of heat.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Furthermore, the system 100 may also include at least one battery or battery pack 191 that includes one or more battery cells. The battery pack 191 and/or its cells may be in jelly roll format or in pouch cell format in which the strip(s) of active material are folded. In either case, the battery cells may be Lithium ion battery cells or another type of battery cell. The battery pack 191 may be electrically coupled to and power the system 100, and can also be electrically coupled to at least one charge receiver for receiving a charge to charge the cells. The receiver can include at least one circuit configured for receiving power (e.g., from a wall outlet) and then providing current to the system 100 to power it and/or providing current to the battery pack 191 to charge cells in the pack 191.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone. The system 100 may also include a camera that gathers one or more images and provides images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
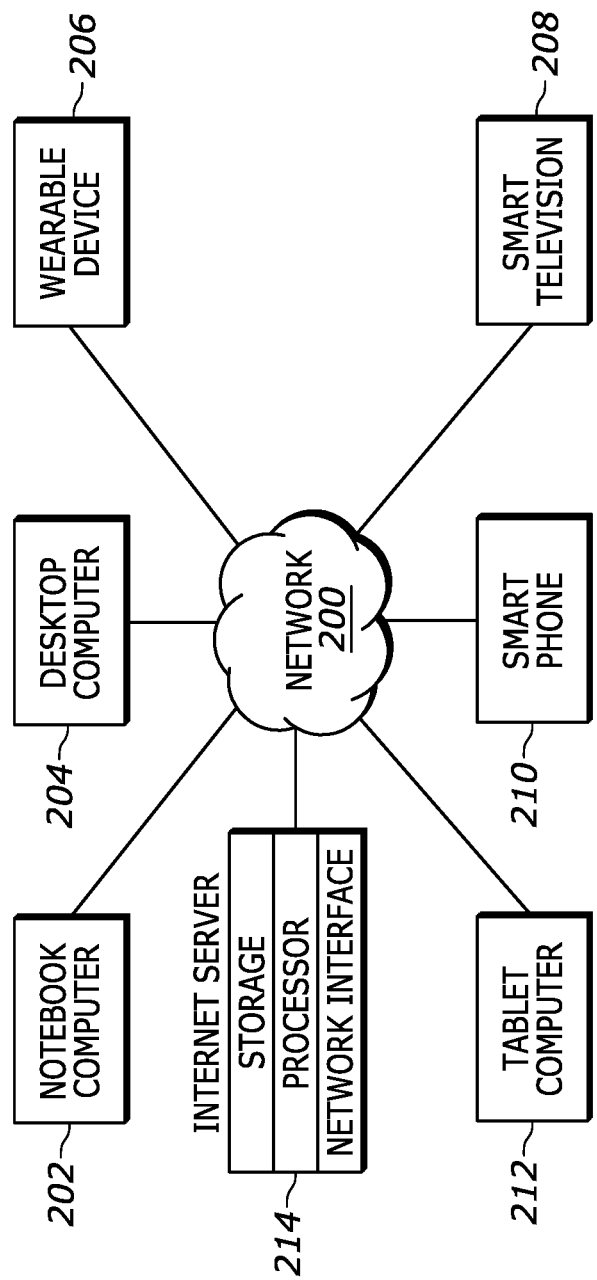
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 and may each include a respective battery/pack that may be discharged as disclosed herein.

Figure 3:
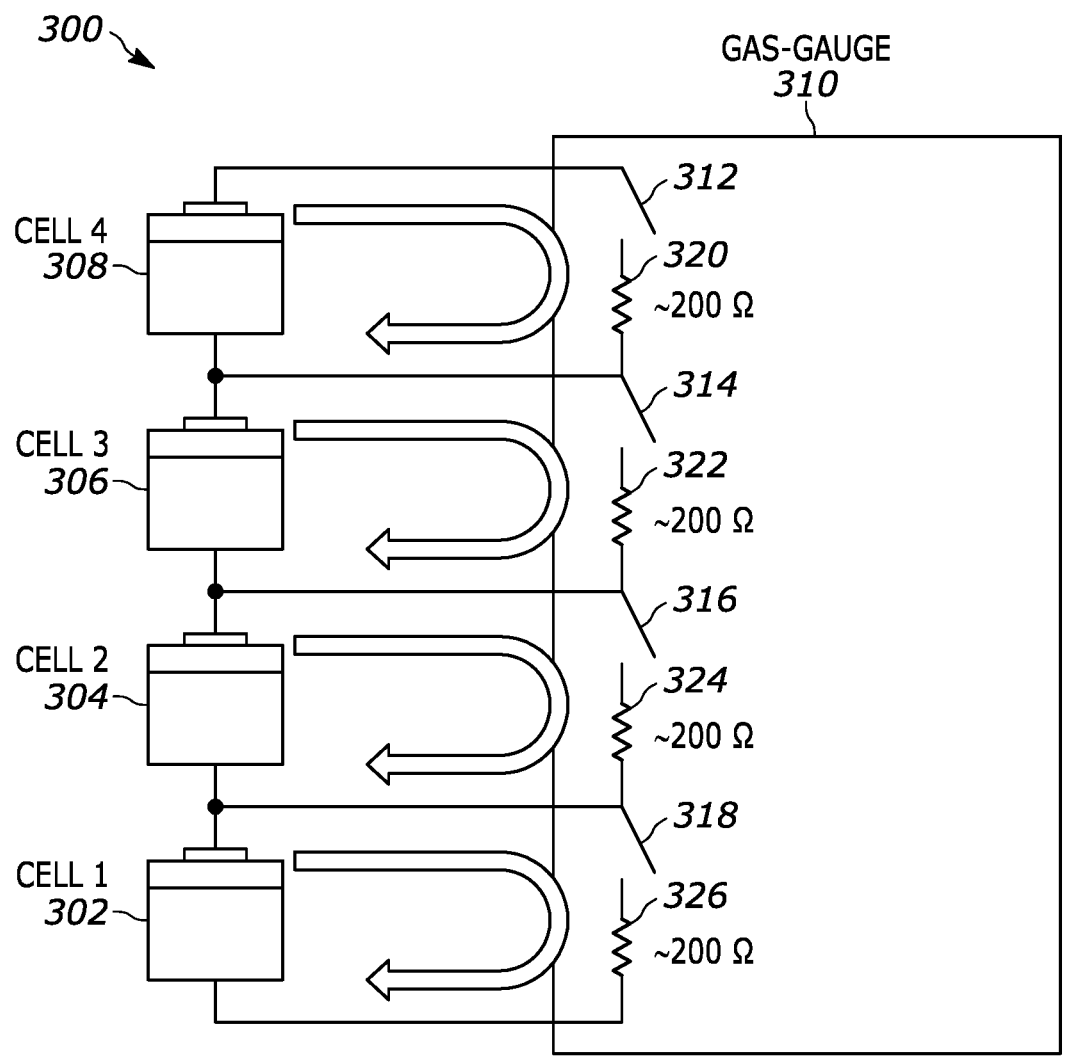
FIGS. 3 and 4 are example circuit diagrams of battery discharge circuits that may be used consistent with present principles.

Now referring to FIG. 3, it shows a simplified circuit diagram for a battery/pack consistent with present principles. The diagram shows a circuit 300 that can be used both for cell balancing during normal battery operation and for discharging of the battery to render the battery permanently inoperable during decommissioning of the battery. As shown in FIG. 3, the circuit 300 may include a first battery cell 302, a second battery cell 304, a third battery cell 306, and a fourth battery cell 308. As also shown in this example, the cells 302-308 are connected in series, though in other examples they may be connected in parallel. The cells 302-308 may be Lithium-ion battery cells or another type of battery cell.

As also shown in FIG. 3, the circuit 300 may include a gas gauge or battery management unit 310 that may have its own processor and storage with instructions executable by the processor to perform functions related to the battery. For example, the processor in the gas gauge 310 may use its firmware to monitor and report the current state of charge of the battery, as well as to control the switches 312-318 to open and close both for cell balancing and for discharge of the battery during decommissioning. The switches 312-318 may be electrical switches and/or field-effect transistors such as metal-oxide-semiconductor field-effect transistors (MOSFETs). Furthermore, note that while the switches 312-318 are shown as being located within the gauge 310, in some examples they may be located in other parts of the battery outside of the gauge 310.

Resistors 320, 322, 324, and 326 may also be included in the circuit 300 between the switches 312-318. The resistors 320-326 may be 200 ohm resistors in certain examples, though resistors of other amounts of resistance may also be used. Also note that as with the switches 312-318, even though the resistors 320-326 are shown as being located within the gauge 310, in other examples they may be located in other parts of the battery outside of the gauge 310.

During "normal" cell balancing consistent with present principles, one of the resistors 320-326 may be used to bleed charge off of a single, proximate cell 302-308 that currently has the highest voltage from amongst all the cells 302-308 to thus bring that cell's voltage down to the level of the other cells 302-308 so that the cells are equalized and/or balanced. For this, only one switch 320-326 may be turned on at a given time for voltage from the highest-voltage cell 302-308 to bleed to a proximate resistor 320-326.

However, also consistent with the principles set forth herein, all the cells 302-308 may be discharged simultaneously and/or concurrently during battery decommissioning. This may be done by turning more than one of the switches 312-318 on at one time and using more than one of the resistors 320-326 at one time (e.g., using all of them at one time) to convert cell energy to heat and also facilitate the elimination of the difference in electric potential between the anodes and cathodes of the cells 302-308, thus reducing the voltages of the cells 302-308. Current flow is illustrated via the arrows shown in FIG. 3.

Voltage may be reduced to zero or near zero during decommissioning so that little to no battery power is left in reserve, which might not otherwise happen during normal operation of the battery where a low voltage threshold or "end-of-discharge" voltage threshold is reached but the battery is not rendered inoperable since it can be charged and re-used again in the future. During normal operation rather than decommissioning, this "normal" low voltage threshold might be nine volts, for example.

Figure 4:
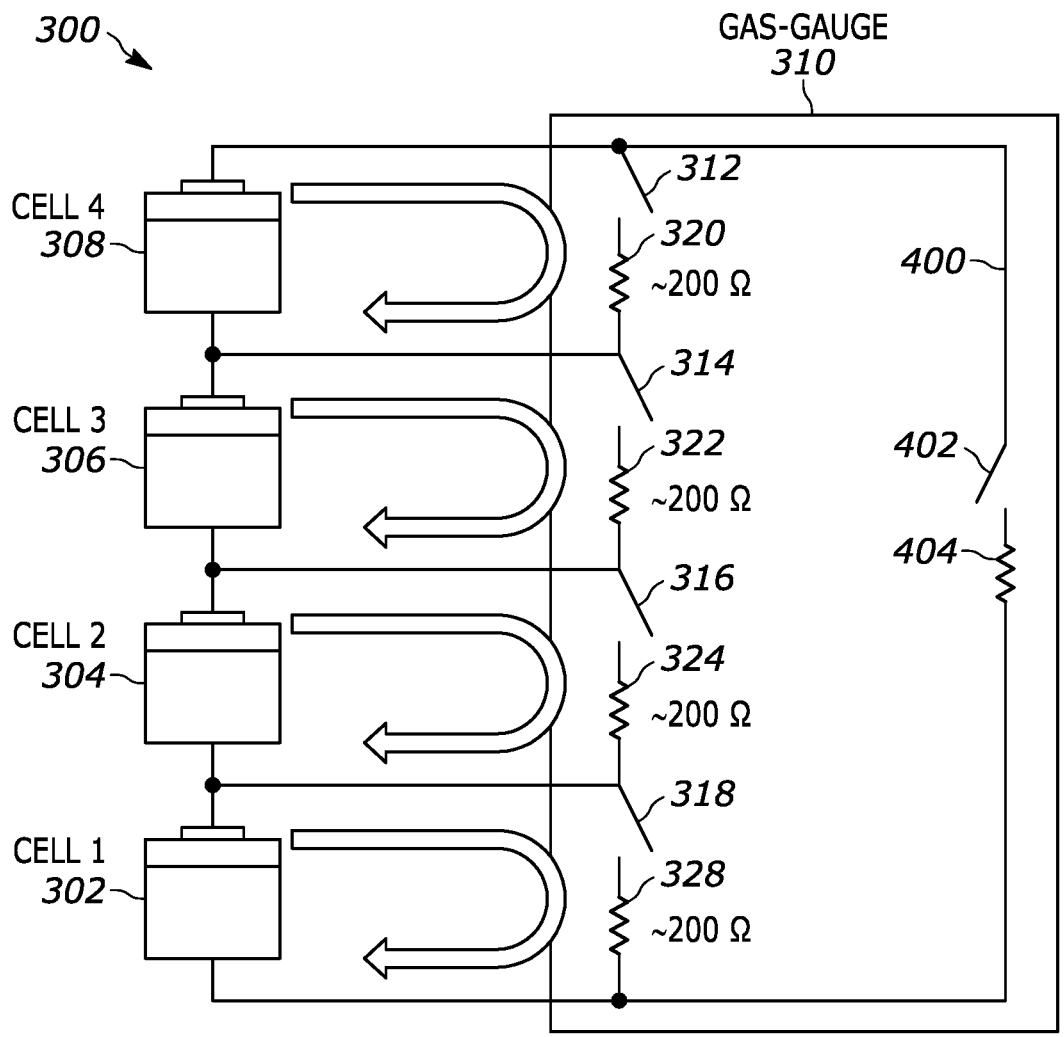

FIG. 4 shows an alternate implementation for decommissioning a battery where, rather than using the cell balancing circuit 300, a dedicated circuit 400 may be used. The circuit 400 may still be connected to the cells 302-308 but may be a dedicated discharge circuit for battery decommissioning in that the circuit 400 may not be used by the battery (or a load connected to the battery) for other purposes besides battery decommissioning to render the battery permanently inoperable. To decommission the battery in this implementation, the gas gauge 310 may employ the circuit 400 for cell discharge by turning on a dedicated switch 400 to allow current to flow through a dedicated resistor 404, bypassing the switches 312-318 and resistors 320-326 of the circuit 300 while still self-discharging the cells 302-308 and hence the battery itself.

Before moving on to the description of other figures, note that in some examples in addition to (or rather than) the battery self-discharging itself according to the example implementations of FIGS. 3 and 4 above, a parasitic load within the battery itself or external to the battery but still inside the same device may be used at the same time as the circuits 300, 400 to discharge the cells 302-308 during decommissioning. For example, the gauge 310 itself may repetitively run a predetermined firmware or software routine to parasitically discharge the cells 302-308 until the cells 302-308 are fully discharged.

Figure 5:
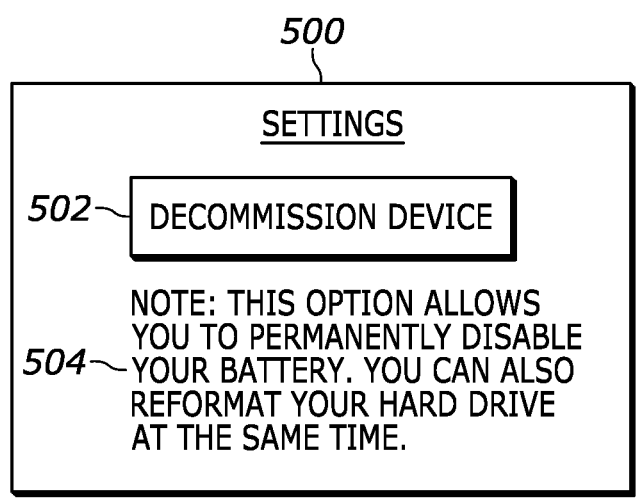
FIGS. 5-7 show example graphical user interfaces (GUIs) that may be presented on the display of a device as part of decommissioning software consistent with present principles.
Figure 6:
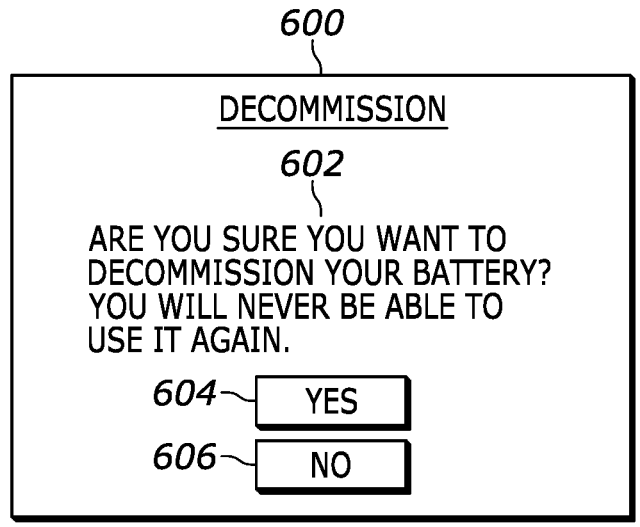
Figure 7:
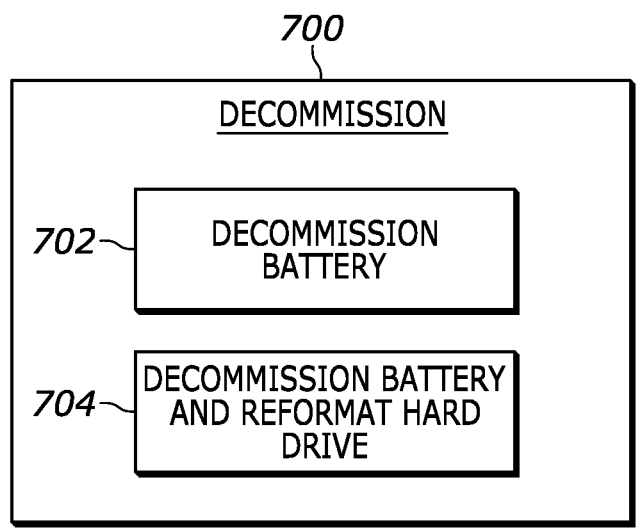

Continuing the detailed description in reference to FIGS. 5-7, suppose an end-user wishes to decommission his or her battery or the device as a whole in which the battery is disposed. This might be because the end-user is divesting himself or herself of the device, and/or recycling the battery or device itself. To begin the decommission process, the user may navigate to a GUI 500 shown in FIG. 5 from a general settings menu on the device, as might be presented on the device's electronic display. The GUI 500 may include a selector 502 that may be user-selectable using touch or cursor input to begin the decommissioning process. The GUI 500 may also include a prompt 504 having text informing the user that decommissioning the device allows the user to permanently disable the device's battery such that the battery may no longer be used by the device itself. The text may further inform the user that the user can also reformat the device's hard disk drive, solid state drive, or other local storage during the same decommissioning process. Reformatting the hard drive may include deleting all data from the drive (including user-saved files and any guest operating system such as Microsoft's Windows or Google's Android), save for possibly basic input/output system (BIOS) files that may be kept.

Responsive to the user selecting the selector 502, the GUI 600 of FIG. 6 may be presented on the device's display. As shown, the GUI 600 may include a prompt 602 asking the user whether the user is sure that the user wants to decommission the battery since the user will not be able to use the battery again to power the device after decommissioning. If the user does not wish to decommission the battery, selector 606 may be selected to end the process and return the user to another screen such as a home screen for the device. However, if the user selects selector 604 to proceed with decommissioning the battery, then in response the device may present the GUI 700 of FIG. 7 on the device's display.

As shown in FIG. 7, the GUI 700 may include a selector 702 that may be selectable to command the device and/or battery itself (through its gas gauge) to decommission the battery (e.g., by self-discharging). Selector 704 may be selectable to command the device to not only decommission the battery but to also reformat the device's disk drive or other local storage based on the same single command provided via selection of the selector 704.

Figure 8:
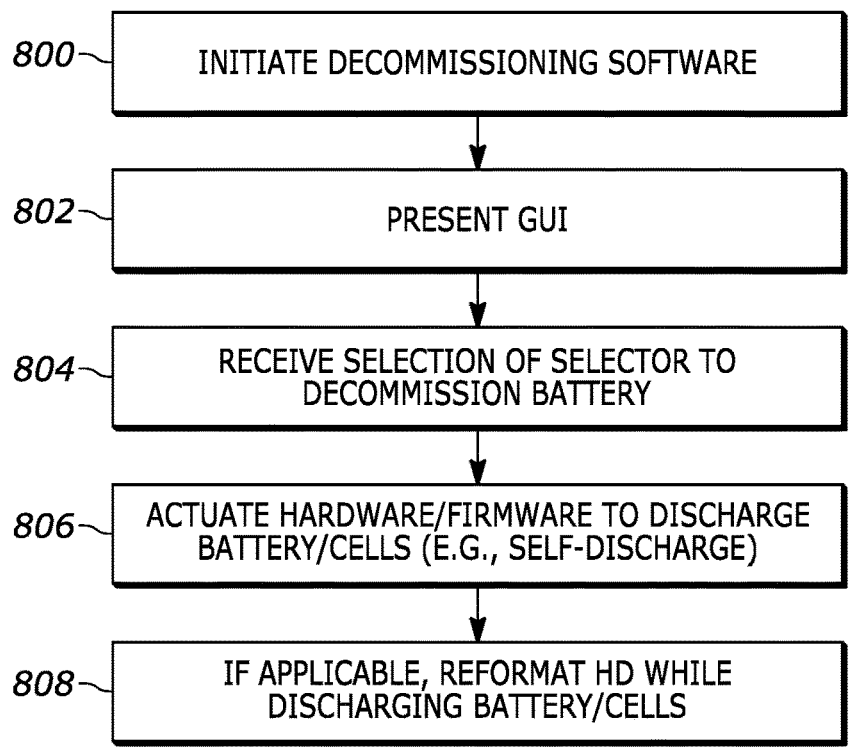
FIG. 8 shows a flow chart of an example algorithm that may be executed by a device as part of the decommissioning software consistent with present principles.

Example logic the device might execute responsive to selection of either of the selectors 702, 704 is shown in FIG. 8. Beginning at block 800, the device may initiate or launch its decommissioning software, such as responsive to a user selecting an associated application icon from the device's display or navigating to the GUI 500 from a general settings menu. The logic may then move to block 802 where the device may present one or more GUIs, such as the GUIs 500, 600, and 700 described above.

From block 802 the logic may then proceed to block 804 where the device may receive a selection of a selector, such as one of the selectors 702 or 704 described above. Responsive to selection of the selector, the logic may then proceed to block 806 where the device may actuate hardware and/or firmware within the battery to discharge the battery's cells. For example, at block 806 the device's central processing unit (CPU) may command the battery's gas gauge firmware to self-discharge the battery's cells using one or both of the circuits 300, 400 as discussed above.

After block 806 the device may proceed to block 808 where the device may, if applicable, also reformat the device's disk drive or other local storage based on the same singular selection of the selector received at block 804. For example, block 808 may be executed based on selection of the selector 704 from the GUI 700 (though it may not be executed based on selection of the selector 702, for example).

Furthermore, in some examples blocks 806 and 808 may be executed concurrently so that the device may perform disk drive reformatting using power from the battery to further assist in or expedite in discharging the battery to zero volts or near-zero volts as part of the battery's decommissioning process. Alternatively, note that whether or not reformatting is performed, the battery may be discharged to less than one volt even if not to zero volts in certain implementations as that will render the battery inoperable for at least some battery types.

Figure 9:
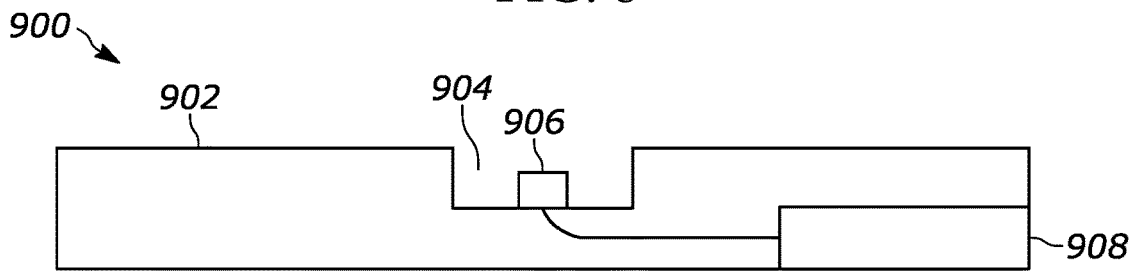
FIG. 9 shows a side cross-sectional view of an example device having a pin hole and button for decommissioning a battery consistent with present principles.

Now in reference to FIG. 9, it shows a side cross-sectional view of a device 900 that may operate consistent with present principles. As shown, the device 900 may have a housing 902. A pin hole 904 or finger-sized hole in the housing 902 may partially protect a depressible button 906 or other hardware element (e.g., touch-sensitive button or surface) from being inadvertently selected or pressed. However, a user may still intentionally place a thin object into the pin hole 904 (or finger into the finger-sized hole) to press/select the button 906, causing a command to be sent directly to the gas gauge in the device's battery 908 since it may be electrically connected to the button 906. For example, the command may be sent to the gas gauge without the command being routed through the device's CPU or other processor external to the battery.

Figure 10:
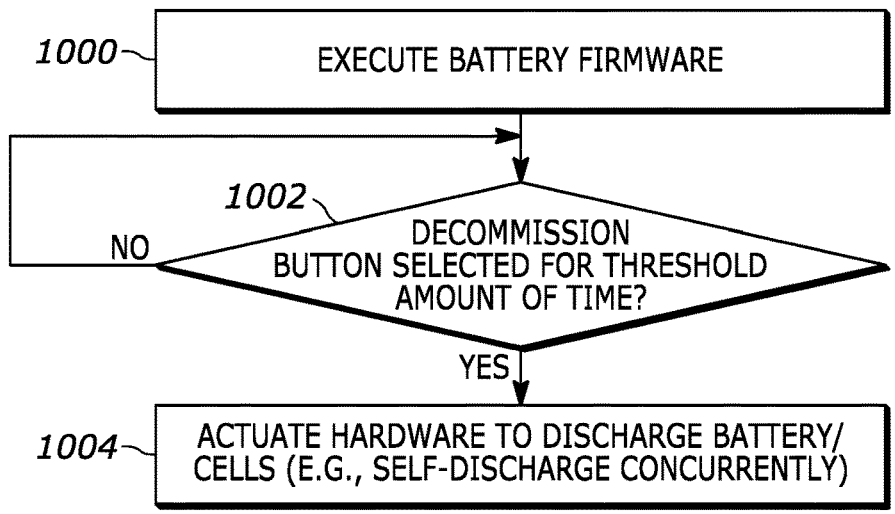
FIG. 10 shows a flow chart of an example algorithm that may be executed by battery firmware for decommissioning a battery consistent with present principles.

FIG. 10 shows example logic that the gas gauge processor may then execute based on the command generated from selection of the button 906. At block 1000 the gas gauge may already be executing its firmware. If it is not already executing its firmware for some reason, the gas gauge may do so at block 1000. The logic may then move to decision diamond 1002 where the gas gauge may determine whether the button 906 was selected (or whether a decommission command has otherwise been received). In some but not all examples, to initiate decommissioning of the battery the button 906 may be required by the firmware to be pressed and continuously held down for a threshold non-zero amount of time (such as ten seconds) to confirm the user's intent to decommission the battery.

If the gas gauge makes a negative determination at diamond 1002, the gas gauge may continue to make the determination of diamond 1002 until an affirmative one is made. Thus, in some examples state logic may be used for diamond 1002. Then, responsive to an affirmative determination at diamond 1002, the logic may proceed to block 1004.

At block 1004 the gas gauge may control its hardware as discussed in reference to FIGS. 3 and 4 above to discharge the cells within its battery. For example, at block 1004 the gas gauge may control the battery to self-discharge its cells concurrently using the circuits 300 and 400 in combination, or by using only one of the circuits 300 or 400 as described above.

Figure 11:
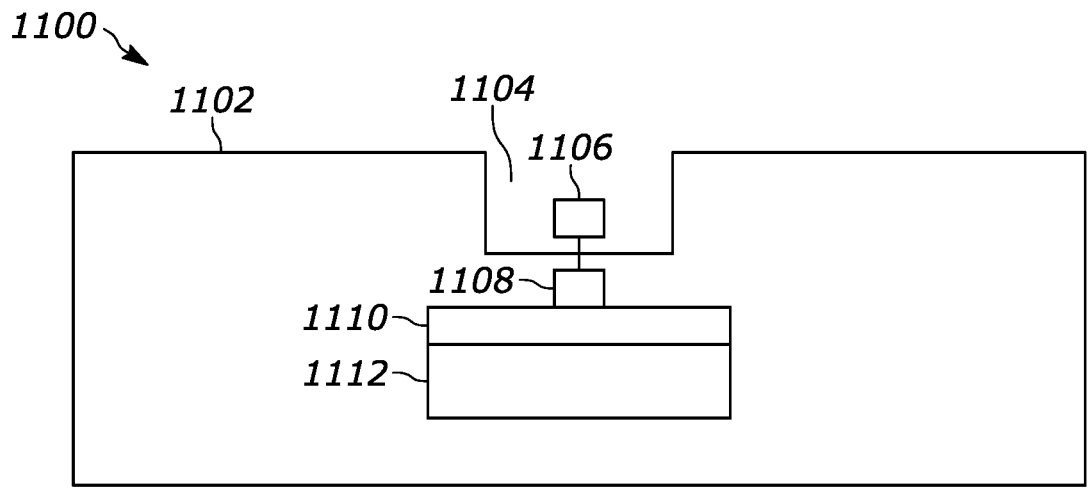
FIG. 11 shows a side cross-sectional view of another example implementation consistent with present principles in which selection of a button completes a circuit to self-discharge the device's battery.

Before moving on to the description of FIG. 11, further note with respect to FIGS. 9 and 10 that in some examples a hole similar to the hole 904 but located in a housing of the battery 908 itself may be used. Thus, even if the battery 908 is removed from the device 900 that is to be powered by the battery 908, a button configured similar to the button 906 but in the hole in the battery 908 itself may be pressed for the battery's processor to then execute the logic of FIG. 10 to decommission the battery.

Now in reference to FIG. 11, it shows a side cross-sectional view of a device 1100 according to another example implementation consistent with present principles. As shown, the device 1100 may have a housing 1102. A pin hole 1104 or finger-sized hole in the housing 1102 may partially protect a depressible button 1106 from being inadvertently selected or pressed. However, a user may intentionally place a thin object into the pin hole 1104 (or finger into the finger-sized hole) to press/select the button 1106.

In this example, by pressing the button 1106 down, a missing link 1108 of electrical line or wiring coupled to the bottom of the button 1106 may extend down to complete a circuit 1110 to decommission the device's battery 1112 as described herein. For example, the circuit 1110 may be similar to the circuit 400 of FIG. 4, but instead of the switch 402 forming part of the circuit 1110, the switch 402 may be replaced with the missing link 1108 so that upon the button 1106 being pressed to place the missing link 1108 into the circuit 1110 to complete the circuit 1110, automatic self-discharge of the battery may be initiated using a resistor similar to the resistor 404 in the circuit 1110 that is dedicated to self-discharge.

Furthermore, note that in some examples the button 1106 itself may be configured in an interference fit and without an internal spring to push back against depression force so that once the button 1106 is depressed, the missing link 1108 continues to complete the circuit 1110 for self-discharge of the battery even if the user removes the object or finger initially used to provide the pressure to press the button 1106. Additionally or alternatively, the button 1106 may be configured so that the missing link 1108 is detachable from the bottom of the button 1106 upon completing the circuit 1110 so that the circuit 1110 remains completed upon button press (e.g., even if the button does have an internal spring to pop back up under spring bias).

Figure 12:
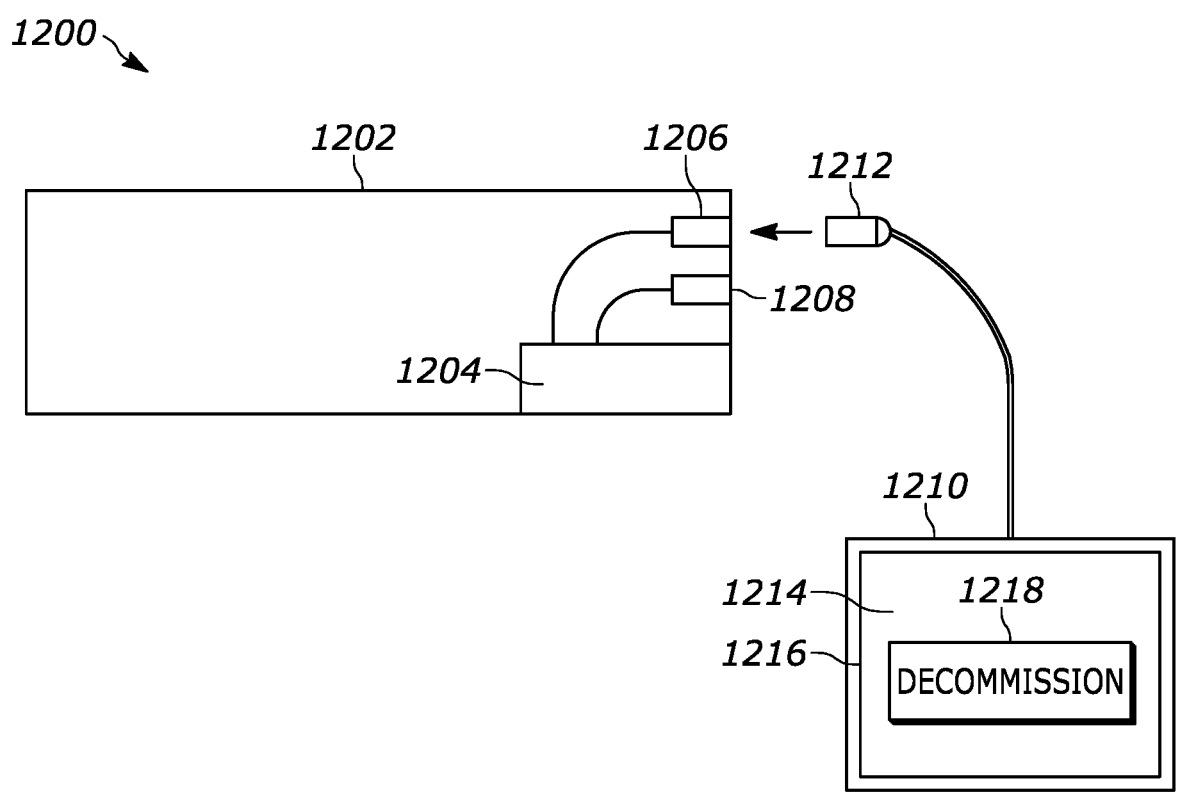
FIG. 12 shows a schematic diagram of two devices being connected to discharge a battery in one of the devices as part of a decommissioning process.

Before moving on to the description of FIG. 12, further note with respect to FIG. 11 that in some examples a hole similar to the hole 1104 but located in a housing of the battery 1112 itself may be used. Thus, even if the battery 1112 is removed from the device 1100 that is to be powered by the battery 1112, a button configured similar to the button 1106 but in the hole in the battery 1112 itself may be pressed to complete the circuit 1110 to decommission the battery as described above.

Continuing the detailed description in reference to FIG. 12, it shows yet another example implementation consistent with present principles. A device 1200 is shown and may have a housing 1202, inside of which may be a battery or battery pack 1204. The device 1200 may also include a first port 1206 in the housing 1202, where the first port 1206 may be a port at which a power adapter or battery charger for the device 1200 can normally be plugged in to provide power to the device 1200 and charge the battery 1204.

The device 1200 may also include a second port 1208 that may be dedicated only for permanently decommissioning/discharging of the battery 1204 consistent with present principles. For example, the second port 1208 may have a female plug receiver shape unique to or standardized for decommissioning batteries to render them permanently inoperable. A complimentary unique male plug 1212 on a cable from a second device 1210 such as a tablet computer or smart phone may then be used to connect the device 1210 to the device 1200 via the dedicated port 1208 to command the battery's firmware to decommission the battery 1204.

However, still note that in certain examples the male plug may be of a shape for connecting the device 1210 to the power adapter port 1206 to access the battery 1204 and its firmware through the port 1206 instead. In still other examples, a universal serial bus (USB) plug/connector may connect the device 1210 to the battery 1204 via a USB port in the housing 1202.

But regardless of what type of port is used, note that the device 1210 itself may be connected directly to the gas gauge of the battery 1204 through the port without communications being routed through the motherboard of the device 1200. Or, whatever port is used may connect to the motherboard of the device 1200 first, and the motherboard may then route commands from the device 1210 to the battery 1204.

It is to be further understood that whatever port is used may be electrically connected to the battery 1204 as shown so that responsive to the device 1210 sensing connection to the battery 1204 via one of the ports, a graphical user interface (GUI) 1214 may be presented on the display 1216 of the device 1210. The GUI 1214 may include a selector 1218 that may be selectable by an end user to issue a command to the firmware in the battery 1204 to permanently decommission the battery using one of the circuits and/or methods disclosed herein. For example, the GUI 1214 may be similar to the GUI 700 and the selector 1218 may therefore be selectable to issue a command similar to the command issued responsive to selection of one of the selectors 702, 704 described above.

Furthermore, in some examples the device 1210 may be used as an external load on the battery 1204. For example, the device 1210 may command the battery's firmware to begin discharge to fully discharge the battery, and to help expedite the process the firmware may permit the battery 1204 to continue providing power to the device 1210 through the port connecting the two devices.

What's more, also note that in some examples the device 1200 may itself present a GUI similar to the GUI 1214 on its own display responsive to connection of the device 1210 to the device 1200 via whatever port is used. Thus, in these examples the device 1210 may be used as an external load to continue to draw power from the battery 1204 while the device 1210 operates, even if the command to decommission the battery is received at the device 1200 via selection of a selector similar to the selector 1218 (but presented on the display of the device 1200 rather than on the display of the device 1210).

Before concluding, it is to also be understood that in some examples, a wireless connection between the devices 1200 and 1210 may be used so that a command to decommission the battery in the device 1200 may be wirelessly provided by the device 1210 based on selection of the selector 1218 as presented on the display of the device 1210. The command may be provided using a secure Wi-Fi or Bluetooth link between the devices to prevent unauthorized hackers from decommissioning the battery in the device 1200 without the consent of the end-user. However, in other examples only a wired connection may be used for battery decommissioning to further prevent hackers.

It may now be appreciated that present principles provide for an improved device-based user interface that improves the functionality and ease of use of the devices disclosed herein in order to dispose of a battery, while also increasing the safety of doing so. The disclosed concepts are rooted in electrical and/or computer technology.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   at least one processor;
   a battery that powers the at least one processor;
   storage accessible to the at least one processor; and
   circuitry to, responsive to a user command to decommission the battery, discharge the battery to render the battery inoperable;
   wherein the circuitry comprises a port at which a second device is connectable, the second device being different from the first device, the port providing a connection for the second device to discharge the battery responsive to the user command; and
   wherein responsive to the user command the circuitry both discharges the battery to render the battery inoperable and reformats the storage to delete data from the storage.

2. The first device of claim 1, wherein the circuitry comprises a button that is selectable to generate the user command.

3. The first device of claim 2, wherein a missing link for completing a circuit is coupled to the button, and wherein selection of the button moves the missing link into the circuit to complete the circuit to discharge the battery.

4. The first device of claim 1, wherein the user command is received at the second device.

5. The first device of claim 1, wherein the user command is received at the first device but is not provided through the second device.

6. The first device of claim 1, wherein the port is a port at which a power adapter or charger is connectable, the power adapter or charger being different from the first and second devices.

7. The first device of claim 1, wherein the port is a first port, the first port being different from a second port at which a power adapter or charger is connectable, the first port dedicated to discharging the battery to render the battery inoperable.

8. The first device of claim 1, wherein the circuitry comprises a dedicated discharge circuit for decommissioning the battery responsive to the user command, the dedicated discharge circuit not being used by the battery for other purposes prior to the first device receiving the user command.

9. The first device of claim 1, wherein as part of rendering the battery inoperable the circuitry reformats the storage using power from the battery to expedite rendering the battery inoperable.

10. A method, comprising:
    receiving, at a device comprising a battery, a user command to decommission the battery; and
    responsive to receiving the user command, reformatting storage of the device and decommissioning the battery via battery discharge, decommissioning the battery comprising rendering the battery inoperable;
    wherein the user command is a single user command initiating the device to both reformat the storage and decommission the battery.

11. The method of claim 10, wherein reformatting the storage comprises reformatting one or more of: a hard disk drive, a solid state drive.

12. The method of claim 10, wherein reformatting the storage comprises deleting user-saved files from the storage and deleting a guest operating system from the storage.

13. The method of claim 10, comprising:
    responsive to receiving the user command and while decommissioning the battery, reformatting the storage of the device using power from the battery to assist in decommissioning the battery via battery discharge.

14. A device, comprising:
    one or more battery cells;
    at least one processor; and
    storage accessible to the at least one processor and comprising instructions executable by the at least one processor to:
    responsive to receipt of a user command to decommission the one or more battery cells, use one or more circuits within a battery pack both to discharge the one or more battery cells and to reformat a drive to delete data from the drive.

15. The device of claim 14, wherein the instructions to use the one or more circuits to discharge the one or more battery cells are embodied in firmware of the device.

16. The device of claim 14, wherein the instructions are executable to:
    present a prompt on a display, the prompt comprising a selector that is selectable to provide the user command, the prompt comprising an indication different from the selector, the indication indicating that selection of the selector will initiate the discharge of the one or more battery cells and the reformatting of the drive.

17. The device of claim 16, comprising the display.

18. The device of claim 14, wherein the user command is a single user command initiating the device to both reformat the drive and discharge the one or more battery cells.

19. The device of claim 14, wherein the device one or more of: is the battery pack, comprises the battery pack.

20. The device of claim 14, wherein as part of discharging the one or more battery cells the device reformats the drive using power from one or more of the one or more battery cells to assist in discharging of the one or more battery cells.

* * * * *